US008572588B2

(12) United States Patent
Grover et al.

(10) Patent No.: US 8,572,588 B2
(45) Date of Patent: Oct. 29, 2013

(54) THREAD-LOCAL MEMORY REFERENCE PROMOTION FOR TRANSLATING CUDA CODE FOR EXECUTION BY A GENERAL PURPOSE PROCESSOR

(75) Inventors: Vinod Grover, Mercer Island, WA (US); Bastiaan Joannes Matheus Aarts, San Jose, CA (US); Michael Murphy, Newark, CA (US)

(73) Assignee: Nvidia Corporation, Santa Clara, CA (US)

( * ) Notice: Subject to any disclaimer, the term of this patent is extended or adjusted under 35 U.S.C. 154(b) by 1227 days.

(21) Appl. No.: 12/415,118

(22) Filed: Mar. 31, 2009

(65) Prior Publication Data

US 2009/0259829 A1 Oct. 15, 2009

Related U.S. Application Data

(60) Provisional application No. 61/043,708, filed on Apr. 9, 2008.

(51) Int. Cl.
*G06F 9/45* (2006.01)
*G06F 9/30* (2006.01)
(52) U.S. Cl.
USPC ............................................ 717/140; 712/220
(58) Field of Classification Search
USPC ........................................................ 717/140
See application file for complete search history.

(56) References Cited

U.S. PATENT DOCUMENTS

| 5,048,018 | A  | 9/1991  | Bernstein et al.    |
| 5,161,216 | A  | 11/1992 | Peps et al.         |
| 5,488,713 | A  | 1/1996  | Norton et al.       |
| 5,860,009 | A  | 1/1999  | Uchihira et al.     |
| 5,867,649 | A  | 2/1999  | Larson              |
| 5,903,889 | A  | 5/1999  | de la Huerga et al. |
| 5,953,530 | A  | 9/1999  | Rishi et al.        |
| 6,275,980 | B1 | 8/2001  | Uchihira et al.     |
| 6,292,822 | B1 | 9/2001  | Hardwick            |
| 6,598,222 | B2 | 7/2003  | Uchihira et al.     |

(Continued)

FOREIGN PATENT DOCUMENTS

| WO | WO 2008/127610 | 10/2008 |
| WO | WO 2008/127622 | 10/2008 |
| WO | WO 2008/127623 | 10/2008 |

OTHER PUBLICATIONS

"Posix Cell API," Symposium on Advanced Computing Systems and Infrastructures, IPSJ Symposium Series vol. 2007, No. 5, dated May 23, 2007, pp. 162-163 (4 pages total).

(Continued)

*Primary Examiner* — Chun-Kuan Lee
*Assistant Examiner* — Brooke Taylor
(74) *Attorney, Agent, or Firm* — Patterson & Sheridan, L.L.P.

(57) ABSTRACT

One embodiment of the present invention sets forth a technique for translating application programs written using a parallel programming model for execution on multi-core graphics processing unit (GPU) for execution by general purpose central processing unit (CPU). Portions of the application program that rely on specific features of the multi-core GPU are converted by a translator for execution by a general purpose CPU. The application program is partitioned into regions of synchronization independent instructions. The instructions are classified as convergent or divergent and divergent memory references that are shared between regions are replicated. Thread loops are inserted to ensure correct sharing of memory between various threads during execution by the general purpose CPU.

20 Claims, 10 Drawing Sheets

(56) References Cited

U.S. PATENT DOCUMENTS

| | | | |
|---|---|---|---|
| 6,748,353 | B1 | 6/2004 | Iliff |
| 6,961,925 | B2 | 11/2005 | Callahan, II et al. |
| 7,058,945 | B2 | 6/2006 | Ichinose et al. |
| 7,454,341 | B1 | 11/2008 | Pan et al. |
| 7,493,606 | B2 | 2/2009 | Morin |
| 7,788,672 | B2 | 8/2010 | Tanaka |
| 7,865,883 | B1 | 1/2011 | Sistare et al. |
| 8,051,412 | B2 | 11/2011 | Kasahara et al. |
| 2004/0205739 | A1 | 10/2004 | Haber et al. |
| 2005/0010911 | A1* | 1/2005 | Kim et al. ............ 717/140 |
| 2005/0022173 | A1* | 1/2005 | Kanade ............... 717/140 |
| 2005/0149904 | A1 | 7/2005 | Ball et al. |
| 2005/0273772 | A1 | 12/2005 | Matsakis et al. |
| 2006/0031814 | A1 | 2/2006 | Morin |
| 2007/0038987 | A1 | 2/2007 | Ohara et al. |
| 2007/0283337 | A1 | 12/2007 | Kasahara et al. |
| 2008/0114937 | A1 | 5/2008 | Reid et al. |
| 2008/0163184 | A1* | 7/2008 | Kanade ............... 717/149 |
| 2008/0244592 | A1 | 10/2008 | Uchihira |
| 2009/0077360 | A1 | 3/2009 | Liu et al. |

OTHER PUBLICATIONS

Office Action, U.S. Appl. No. 12/408,559, dated Feb. 1, 2012.

Nickolls, et al., "Scalable Parallel Programming with CUDA," Mar./Apr. 2008 ACM Queue vol. 6, Issue 2, p. 40-53.

Lee, et al., "Cetus—An Extensible Compiler Infrastructure for Source-toSource Transformation," 16th Annual Workshop on Languages and Compilers for Parallel Computing (LCPC' 2003), 2003. (15 pages).

Stratton, et al., "MCUDA: An Efficient Implementation of CUDA Kernels on Multi-cores," Impact Technical Report 08-01, University of Illinois at Urbana-Champaign, Feb. 2008. (19 pages).

Combined Search and Examination Report, GB App. No. 0905719.1, Jul. 17, 2009.

Notice of Preliminary Rejection, KR Application No. 10-2009-31038, dated Oct. 25, 2011.

Eli Tilevich, et al. "J-Orchestra: Automatic Java Application Partitioning," Proc. of the 16th European Conference Ojbect Oriented Programming (ECOOP 2002), pp. 178-204, Jun. 10-14, 2002.

D.Y. Hwang, et al., "Transform Nested Loops into MultiThread in Java Programming Language for Parallel Processing," KIPS Journal, vol. 5, No. 8, pp. 1997-2012, 1998.

Notice of Preliminary Rejection, KR Application No. 10-2009-31039, dated Oct. 25, 2011.

Moss, et al. "Toward Acceleration of RSA Using 3D Graphics Hardware," LNCS 4887, Dec. 2007, pp. 369-388.

Final Office Action, U.S. Appl. No. 12/415,075, dated Jan. 7, 2013.

Non Final Office Action, U.S. Appl. No. 12/415,075, dated Jun. 7, 2012.

Non Final Office Action, U.S. Appl. No. 12/415,090, dated Jun. 11, 2012.

Non Final Office Action, U.S. Appl. No. 12 408,559, dated Feb. 1, 2012.

Non Final Office Action, U.S. Appl. No. 12/407,711, dated Mar. 28, 2012.

\* cited by examiner

THREAD-LOCAL MEMORY REFERENCE PROMOTION FOR TRANSLATING CUDA CODE FOR EXECUTION BY A GENERAL PURPOSE PROCESSOR

CROSS-REFERENCE TO RELATED APPLICATIONS

This application claims benefit of U.S. provisional patent application Ser. No. 61/043,708 filed Apr. 9, 2008, and titled "System For Executing GPU-Accelerated Code on Multi-Core Architectures." The subject material of this related application is hereby incorporated herein by reference.

BACKGROUND OF THE INVENTION

1. Field of the Invention

Embodiments of the present invention relate generally to compiler programs and more specifically to a translator that retargets an application program written for execution by a multi-core graphics processor for execution by a general purpose processor with shared memory.

2. Description of the Related Art

Modern graphics processing systems typically include a multi-core graphics processing unit (GPU) configured to execute applications in a multi-threaded manner. The graphics processing systems also include memory with portions that shared between the execution threads and dedicated to each thread.

NVIDIA's CUDA™ (Compute Unified Device Architecture) technology provides a C language environment that enables programmers and developers to write software applications to solve complex computational problems such as video and audio encoding, modeling for oil and gas exploration, and medical imaging. The applications are configured for parallel execution by a multi-core GPU and typically rely on specific features of the multi-core GPU. Since the same specific features are not available in a general purpose central processing unit (CPU), a software application written using CUDA may not be portable to run on a general purpose CPU.

As the foregoing illustrates, what is needed in the art is a technique for enabling application programs written using a parallel programming model for execution on multi-core GPUs to run on general purpose CPUs without requiring the programmer to modify the application program.

SUMMARY OF THE INVENTION

One embodiment of the present invention sets forth a method for promoting thread-local memory references of application program as part of translating the application program for execution by a general purpose processor. The method includes the steps of receiving the application program written using a parallel programming model for execution on a multi-core graphics processing unit and partitioning the application program into regions of synchronization independent instructions to produce a partitioned application program. A thread-local memory reference of the partitioned application program that contributes to a result of a first vector statement in the partitioned application program is identified. The thread-local memory reference is promoted to a vector reference to produce a translated application program.

One advantage of the disclosed method is that application programs written using a parallel programming model for execution on multi-core GPUs are portable to general purpose CPUs without modification. Portions of the application that rely on specific features of the multi-core GPU are converted by a translator for execution by a general purpose CPU. The application program is partitioned into regions of synchronization independent instructions. The instructions are classified as convergent or divergent and divergent memory references that are shared between regions are replicated. Thread loops are inserted to ensure correct sharing of memory between various threads during execution by the general purpose CPU.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the present invention. However, it will be apparent to one of skill in the art that the present invention may be practiced without one or more of these specific details. In other instances, well-known features have not been described in order to avoid obscuring the present invention.

Figure 1:
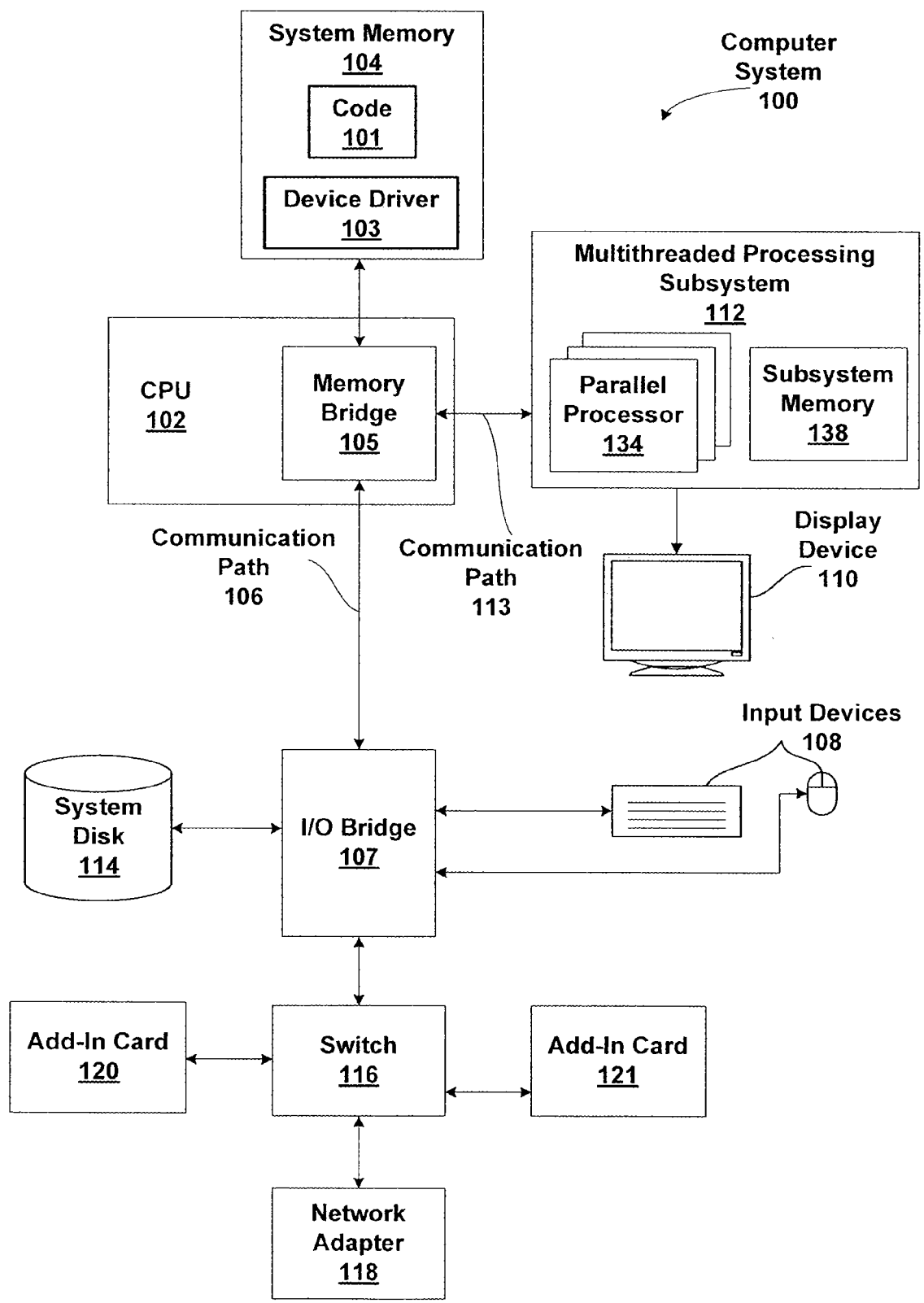
FIG. 1 is a block diagram illustrating a computer system.

FIG. 1 is a block diagram illustrating a computer system 100 configured to execute code written using CUDA. Computer system 100 includes a CPU 102 and a system memory 104 communicating via a bus path that includes a memory bridge 105. Memory bridge 105, which may be, e.g., a Northbridge chip, is connected via a bus or other communication path 106 (e.g., a HyperTransport link) to an I/O (input/output) bridge 107. I/O bridge 107, which may be, e.g., a Southbridge chip, receives user input from one or more user input devices 108 (e.g., keyboard, mouse) and forwards the input to CPU 102 via path 106 and memory bridge 105. A multithreaded processing subsystem 112 is coupled to memory bridge 105 via a bus or other communication path 113 (e.g., a PCI Express, Accelerated Graphics Port, or HyperTransport link). In one embodiment, multithreaded processing subsystem 112 is a graphics subsystem that delivers pixels to a display device 110 (e.g., a conventional CRT or LCD based monitor). A system disk 114 is also connected to I/O bridge 107. A switch 116 provides connections between I/O bridge 107 and other components such as a network adapter 118 and various add-in cards 120 and 121. Other components (not explicitly shown), including USB or other port connections, CD drives, DVD drives, film recording devices, and the like, may also be connected to I/O bridge 107. Communication paths interconnecting the various components in FIG. 1 may be implemented using any suitable protocols, such as PCI (Peripheral Component Interconnect), PCI Express (PCI-E), AGP (Accelerated Graphics Port), HyperTransport, or any other bus or point-to-point communication protocol(s), and connections between different devices may use different protocols as is known in the art.

CPU 102 operates as the control processor of computer system 100, managing and coordinating the operation of other system components. In particular, CPU 102 issues commands that control the operation of parallel processors 134 within multithreaded processing subsystem 112. In some embodiments, CPU 102 writes a stream of commands for parallel processors 134 to a command buffer (not shown), which may reside in system memory 104, subsystem memory 138, or another storage location accessible to both CPU 102 and parallel processors 134. Parallel processors 134 read the command stream from the command buffer and execute commands asynchronously with respect to the operation of CPU 102.

System memory 104 includes an execution image of an operating system, a device driver 103, and CUDA code 101 that is configured for execution by multithreaded processing subsystem 112. CUDA code 101 incorporates programming instructions intended to execute on multithreaded processing subsystem 112. In the context of the present description, code refers to any computer code, instructions, and/or functions that may be executed using a processor. For example, in various embodiments, the code may include C code, C++ code, etc. In one embodiment, the code may include a language extension of a computer language (e.g., an extension of C, C++, etc.).

The operating system provides the detailed instructions for managing and coordinating the operation of computer system 100. Device driver 103 provides detailed instructions for managing and coordinating operation of the multithreaded processing subsystem 112, and in particular parallel processors 134. Furthermore, device driver 103 may provide compilation facilities for generating machine code specifically optimized for parallel processors 134. Device driver 103 may be provided in conjunction with the CUDA™ framework provided by NVIDIA Corporation.

In one embodiment, the multithreaded processing subsystem 112 incorporates one or more parallel processors 134 which may be implemented, for example, using one or more integrated circuit devices such as programmable processors, application specific integrated circuits (ASICs). Parallel processors 134 may include circuitry optimized for graphics and video processing, including, for example, video output circuitry, and a graphics processing unit (GPU). In another embodiment, the multithreaded processing subsystem 112 may be integrated with one or more other system elements, such as the memory bridge 105, CPU 102, and I/O bridge 107 to form a system on chip (SoC). One or more parallel processors 134 may output data to display device 110 or each parallel processor 134 may output data to one or more display devices 110.

Parallel processors 134 advantageously implements a highly parallel processor that includes one or more processing cores, each of which is capable of executing a large number of threads concurrently where each thread is an instance of a program, such as code 101. Parallel processors 134 can be programmed to execute processing tasks relating to a wide variety of applications, including but not limited to, linear and nonlinear data transforms, filtering of video and/or audio data, modeling operations (e.g., applying laws of physics to determine position, velocity and other attributes of objects), image rendering operations (e.g., tessellation shader, vertex shader, geometry shader, and/or pixel shader programs), and so on. Parallel processors 134 may transfer data from system memory 104 and/or local subsystem memory 138 into local (on-chip) memory, process the data, and write result data back to system memory 104 and/or subsystem memory 138, where such data can be accessed by other system components, including CPU 102 or another multithreaded processing subsystem 112.

A parallel processor 134 may be provided with any amount of subsystem memory 138, including no subsystem memory 138, and may use subsystem memory 138 and system memory 104 in any combination. For instance, a parallel processor 134 can be a graphics processor in a unified memory architecture (UMA) embodiment. In such embodiments, little or no dedicated subsystem memory 138 would be provided, and parallel processor 134 would use system memory 104 exclusively or almost exclusively. In UMA embodiments, a parallel processor 134 may be integrated into a bridge chip or processor chip or provided as a discrete chip with a high-speed link (e.g., PCI-E) connecting the parallel processor 134 to system memory 104 via a bridge chip or other communication means.

As noted above, any number of parallel processors 134 can be included in a multithreaded processing subsystem 112. For instance, multiple parallel processors 134 can be provided on a single add-in card, or multiple add-in cards can be connected to communication path 113, or one or more parallel processors 134 can be integrated into a bridge chip. Where multiple parallel processors 134 are present, those parallel processors 134 may be operated in parallel to process data at a higher throughput than is possible with a single parallel processor 134. Systems incorporating one or more parallel processors 134 may be implemented in a variety of configurations and form factors, including desktop, laptop, or handheld personal computers, servers, workstations, game consoles, embedded systems, and the like.

In some embodiments of parallel processors 134, single-instruction, multiple-data (SIMD) instruction issue techniques are used to support parallel execution of a large number of threads without providing multiple independent instruction units. In other embodiments, single-instruction, multiple-thread (SIMT) techniques are used to support parallel execution of a large number of generally synchronized threads. Unlike a SIMD execution regime, where all processing engines typically execute identical instructions, SIMT execution allows different threads to more readily follow divergent execution paths through a given thread program. Persons skilled in the art will understand that a SIMD processing regime represents a functional subset of a SIMT processing regime. Functional units within parallel processors 134 support a variety of operations including integer and floating point arithmetic (e.g., addition and multiplication), comparison operations, Boolean operations (AND, OR, XOR), bit-shifting, and computation of various algebraic functions (e.g., planar interpolation, trigonometric, exponential, and logarithmic functions, etc.).

The series of instructions transmitted to a particular processing unit (not shown) within a processing core (not shown) of parallel processors 134 constitutes a thread, as previously defined herein, and the collection of a certain number of concurrently executing threads across the processing units within one processing core is referred to herein as a "thread group." As used herein, a "thread group" refers to a group of threads executing the same program on different input data, with each thread of the group being assigned to a different processing unit in a processing core. A thread group may include fewer threads than the number of processing units, in which case some processing units will be idle during cycles when that thread group is being processed. A thread group may also include more threads than the number of processing units, in which case processing will take place over multiple clock cycles.

Since each processing core can support up to G thread groups concurrently, it follows that up to G×M thread groups can be executing in a processing core at any given time, where M is the number of processing cores in a parallel processor 134. Additionally, a plurality of related thread groups may be active (in different phases of execution) at the same time within a processing core. This collection of thread groups is referred to herein as a "cooperative thread array" ("CTA"). The size of a CTA is generally determined by the programmer and the amount of hardware resources, such as memory or registers, available to the CTA. The CUDA programming model reflects the system architecture of GPU accelerators. An exclusive local address space is available to each thread and a shared per-CTA address space is used to pass data between threads within a CTA. Processing cores also have access to off-chip "global" memory, which can include, e.g., subsystem memory 138 and/or system memory 104.

A host portion of a CUDA application program is compiled using conventional methods and tools, while kernel functions specify CTA processing. At the highest level, the CUDA memory model separates the host and device memory spaces, such that host code and kernel code can only directly access their respective memory spaces. API (application programming interface) functions allow copying of data between the host and device memory spaces. In the shared-memory CPU execution of the CUDA programming model, a controlling CPU thread can executing in parallel with the parallel CTAs without potential data races. The host memory space is defined by the C programming language and the device memory spaces are specified as Global, constant, local, shared, and texture. All threads may access the global, constant, and texture memory spaces. As previously explained, access to the local space is limited to a single thread and access to the shared space is limited to threads in a CTA. This memory model encourages using small memory spaces for low-latency accesses, and encourages wise usage of large memory spaces which typically have longer latency.

A CUDA program, such as code 101 is typically organized as a set of synchronous or asynchronous executions of CTAs in one, two, or three dimensions, e.g., x, y, and z. A 3-tuple index uniquely identifies threads within a thread block. Thread blocks themselves are distinguished by an implicitly defined 2-tuple variable. The ranges of these indexes are defined at runtime and the runtime environment checks that the indexes conform to any hardware limitations. Each CTA may be executed by a parallel processor 134 in parallel with other CTAs. Many CTAs may run in parallel with each parallel processor 134 executing one or more CTAs. The runtime environment is responsible for managing the execution of CUDA code 101 synchronously or asynchronously as required. Threads within a CTA communicate and synchronize with each other by the use of shared memory and a barrier synchronization primitive called synchthreads( ). CUDA guarantees that threads within a thread block will be live simultaneously, and provides constructs for threads within a thread block to perform fast barrier synchronizations and local data sharing. Distinct thread blocks within a CTA (defined by one or more dimensions) have no ordering imposed on their creation, execution, or retirement. In addition, parallel CTAs are not allowed access to system calls, including I/O. The CUDA programming model only enforces global synchronization between parallel CTAs, and provides intrinsic atomic operations for limited communication between blocks within a CTA.

The body of each thread, referred to as a kernel, is specified using CUDA which may be represented in standard C using memory model annotations and the barrier synchronization primitive. The semantics of a CUDA program is that each kernel is executed by all the threads in a CTA in an order that respects the memory ordering implied by the barrier synchronization primitive. In particular, all shared memory references within a CTA that occur before a barrier synchronization primitive must be completed before any shared memory references that occur after the barrier synchronization primitive.

Each instance of a barrier synchronization primitive in kernel code conceptually represents a separate logical barrier and should be treated as static. It is illegal to invoke a barrier synchronization primitive in both paths of an if-else construct when CUDA threads may take different branches of the construct. Although all threads within a thread block will reach one of the synchronization primitives, they represent separate barriers, each requiring that either all or none of the threads reach it. Therefore, such a kernel will not execute correctly. More generally, CUDA code is not guaranteed to execute correctly if a synchronization primitive is contained within any control flow construct that behaves differently for different threads within a thread block.

Figure 2:
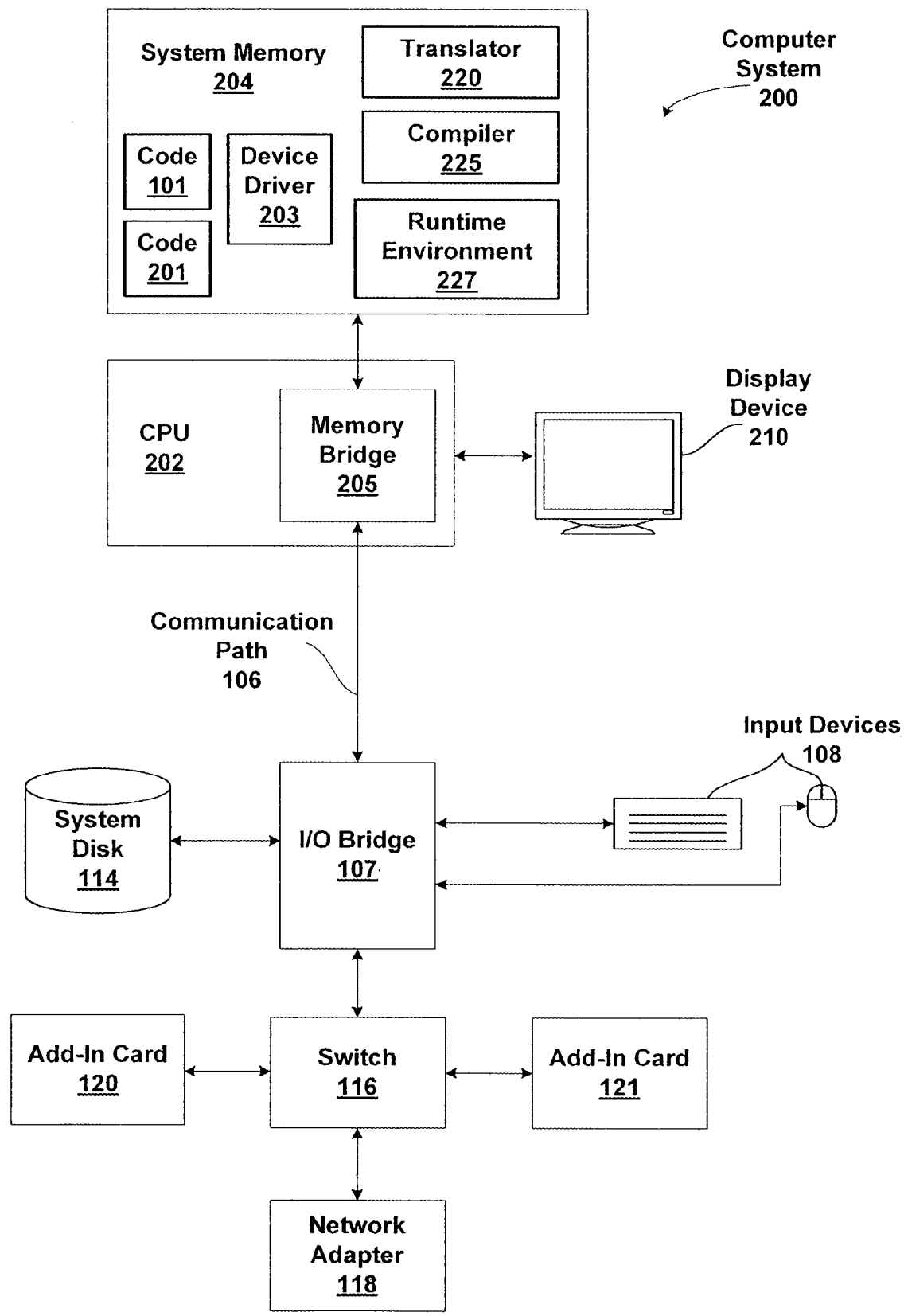
FIG. 2 is a block diagram illustrating a computer system, according to one embodiment of the present invention.

FIG. 2 is a block diagram illustrating a computer system 200, according to one embodiment of the present invention. Computer system 200 includes a CPU 202 and a system memory 204 communicating via a bus path that includes a memory bridge 205. Memory bridge 205, which may be, e.g., a Northbridge chip, is connected via a bus or other communication path 106 (e.g., a HyperTransport link) to an I/O (input/output) bridge 107. CPU 202 produces output for display on display device 210 (e.g., a conventional CRT or LCD based monitor).

Multithreaded processing subsystem 112 is not included in computer system 200 and CUDA code 101 is not adapted for execution by a general purpose processor, such as CPU 202. CUDA code 101, is adapted for execution by multithreaded processing subsystem 112, and is translated using translator 220 to produce translated code 201 that does not include the barrier synchronization primitive. In order for CPU 202 to run the program represented by code 101, code 101 must first be translated into code 201. The translated code may then be compiled by compiler 225 for execution by CPU 202. Compiler 225 may perform optimizations that are specific to CPU 202. Translating the code refers to converting the code written in a first computer language into a second computer language. Compiling the code refers to converting the code written in a computer language (e.g., a source code) into another computer language (e.g., an object code). Translator 220 is described in conjunction with FIG. 3A and compiler 225 is described in conjunction with FIG. 4. Compiler 225 may be included within a device driver 203 that is configured to interface between code 101, code 201 and CPU 202. A runtime environment 227 is configured to implement functions for the compiled code, e.g., input and output, memory management, and the like. Runtime environment 227 also launches compiled code for execution by CPU 202. Translator 220 performs optimizing transformations to serialize operations across the fine-grained threads of a CUDA thread group into a single CPU thread, while the runtime environment 227 schedules thread groups as work units for parallel processing by CPU 202.

The primary obstacle preventing portability of CUDA applications designed to run on GPUs for execution by general purpose CPUs is the granularity of parallelism. Conventional CPUs do not support the hundreds of hardware thread contexts required for a single CUDA CTA. Therefore, the primary goal of a system implementing the CUDA programming model on a general purpose CPU is to distribute the task-level parallelism to the available CPU cores. At the same time, the system must consolidate the microthreads within a task into a single CPU thread to prevent excessive scheduling overhead and frequent intercore synchronization.

Figure 3A:
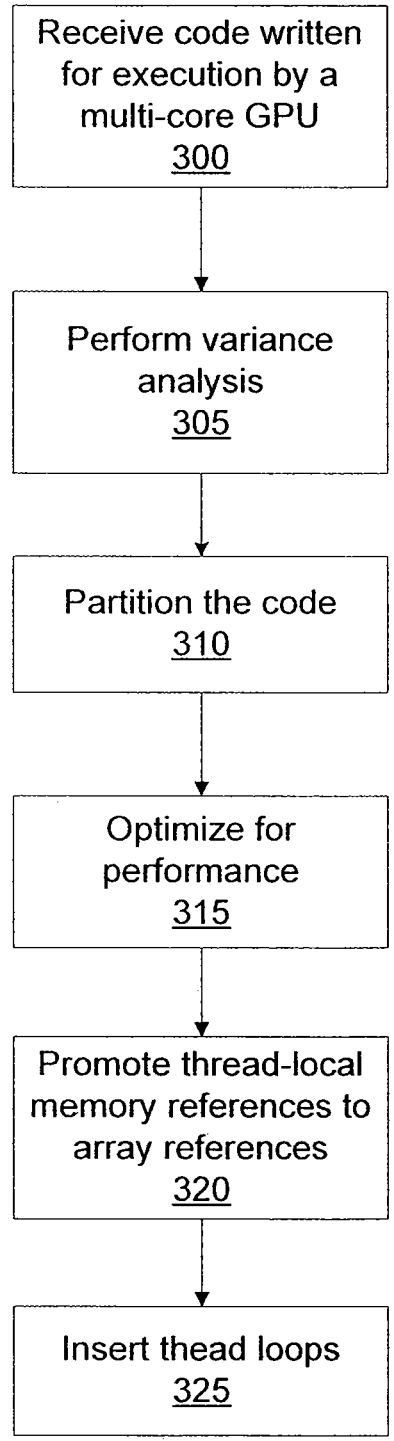
FIG. 3A is a flow diagram of method steps for translating code written for execution by a multi-core graphics processing unit to code for execution by a general purpose processor, according to one embodiment of the present invention.

FIG. 3A is a flow diagram of method steps for translating code 101 that is written for execution by a multi-core graphics processing unit, e.g., multithreaded processing subsystem 112, to code 201 for execution by a general purpose processor, e.g., CPU 202, according to one embodiment of the present invention. Translator 220 is configured to perform one or more of the steps shown in FIG. 3A in order to preserve the barrier synchronization primitive semantic that is used in code 101. Translator 220 "unrolls" the parallel threads by partitioning code 101 around the barrier synchronization primitives, reduces the use of shared state, improves the locality of references for memory access, and inserts thread loops to transform CUDA-specific code for execution by a general purpose processor. It is possible to achieve good execution performance using CPU 202 to execute code 201 without changing CUDA code 101 that is targeted for execution by a multithreaded processing subsystem 112. Compiler 225 may exploit vector instructions capability provided by CPU 202 and perform optimizations when compiling code 201 for execution.

Figure 3B:
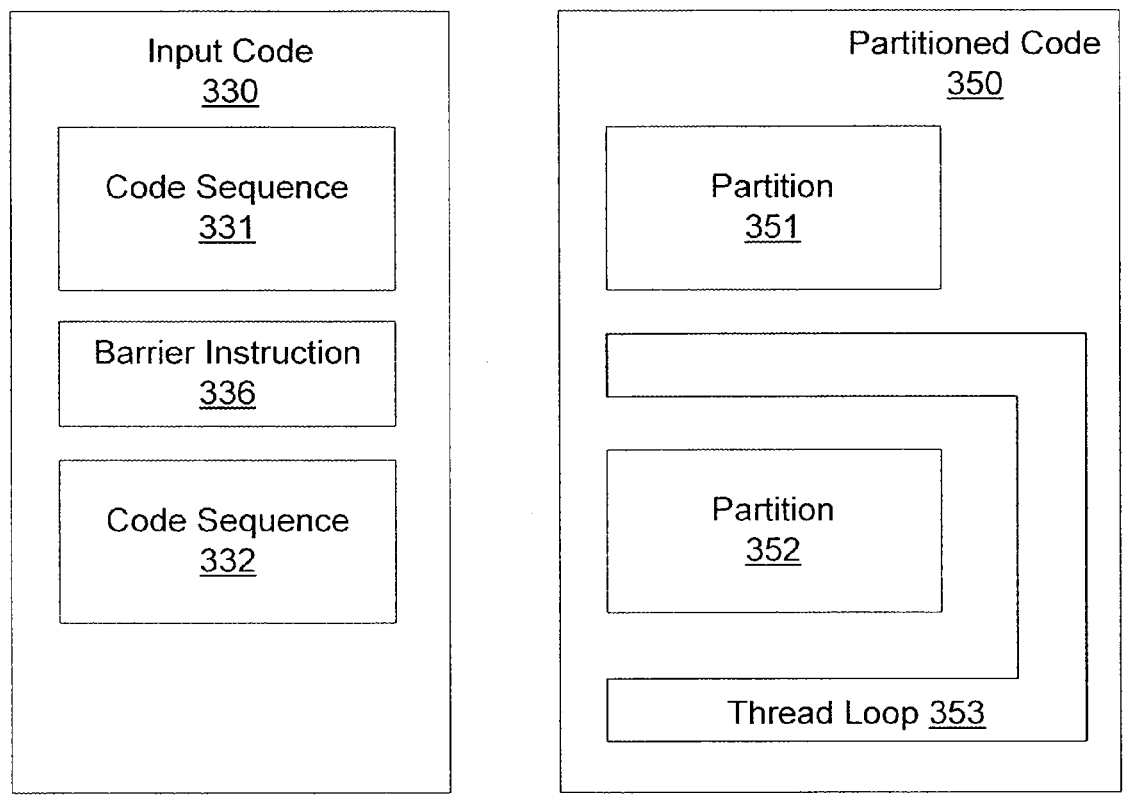
FIG. 3B is a conceptual diagram illustrating input code that is translated into partitioned code, according to one embodiment of the present invention.
Figure 3C:
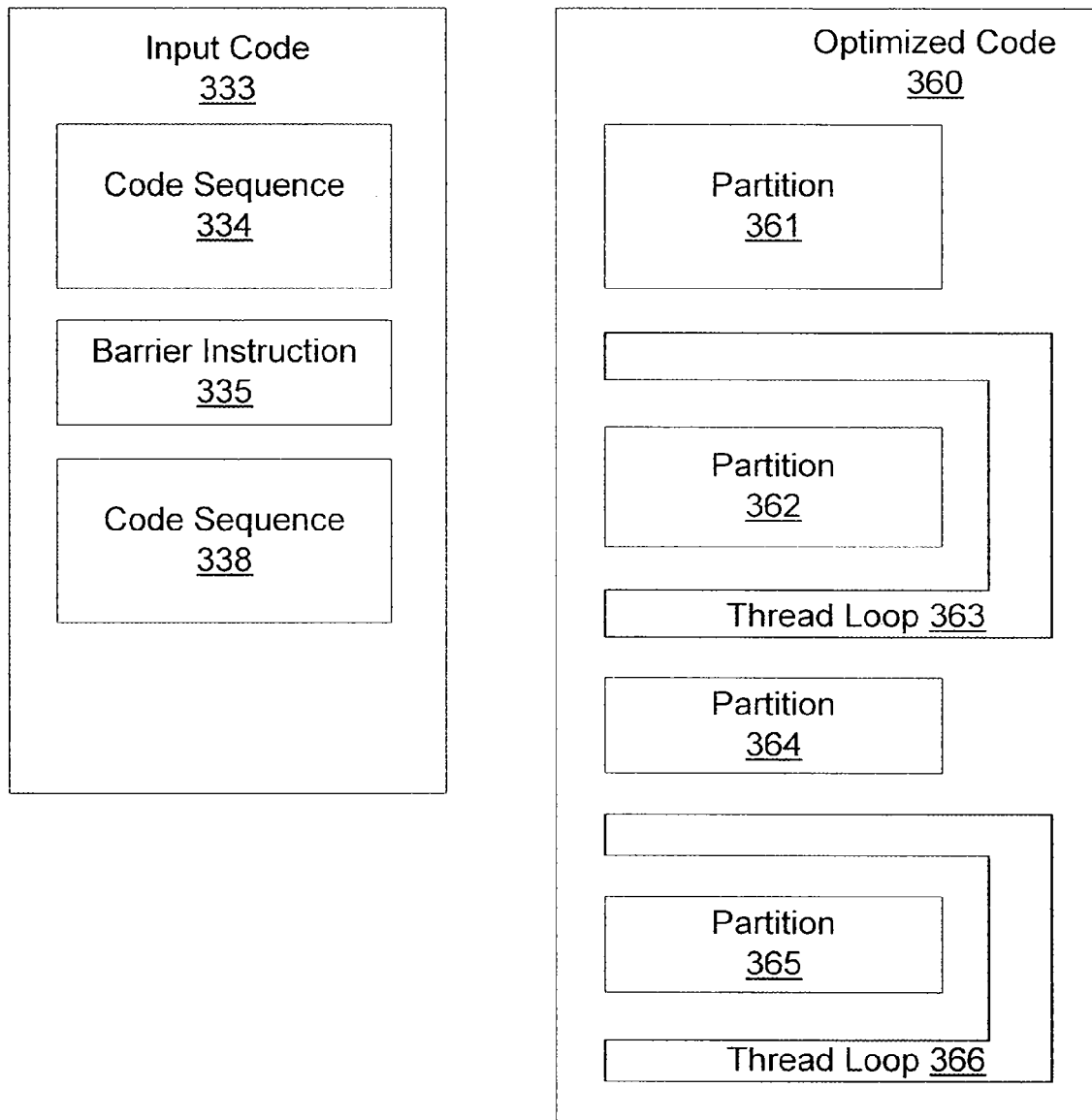
FIG. 3C is a conceptual diagram illustrating input code that is translated into optimized code, according to one embodiment of the present invention.

In step 300 translator 220 receives code 101 written for execution by a multi-core GPU, such as multithreaded processing subsystem 112 or a processor including one or more parallel processors 134, e.g., CUDA code 101. The code received in step 300 may be represented as a control flow graph consisting of basic block nodes connected by edges. Each basic block specifies the operations performed by target environment, e.g., CPU 202. The edges of the control flow graph represent jumps in the control flow. In step 305 translator 220 partitions CUDA code 101 around the barrier synchronization primitives to produce partitioned code. The partitioned code is shown in FIGS. 3B and 3C and the partitioning process is described in conjunction with those figures. A synchronization partition is a region of code within which the ordering of operations is determined entirely by the control flow and data flow properties of the basic blocks within the partition. A partition has the property that a thread loop can be inserted around a partition to run the parallel threads. The control flow graph may be used to produce a synchronization partition control flow graph by replacing each synchthreads primitive with an edge, separating a basic block node into different partitions.

In step 310 the partitioned code is classified so that each statement is identified as either convergent or divergent. The partitioned code may include expressions and statements. An expression is a computation which may involve constants, implicit threadIDs, and named variables created by the programmer, but has no side-effects or assignments. A simple statement is defined as a computational expression resulting in a single assignment. A general statement can also represent a barrier, control flow conditional or loop construct, or a sequential block of statements. The CTA dimensions, x, y, and z are propagated through the code to determine whether each operation is dependent on one or more of the CTA dimensions. Operations that reference a threadID (thread identifier) in dimension x, y, and/or z are considered divergent since a thread that references a CTA dimension may diverge from other threads in the same CTA during execution. For example, an operation that depends on threadID.x is divergent for the x dimension. Another operation that does not depend on threadID.x is convergent in the x dimension. Divergent statements require thread loops for each CTA dimension that they reference.

In step 315 the partitioned code is optimized for performance using the classification information to produce optimized code. For example, instructions within a partition may be reordered to fuse operations so that those operations with the same classification are grouped together and can fall within the same thread loop that is inserted in step 325. Operations are ordered such that those operations with fewer threadID dimensions in their variance vector precede the operations that are dependent on more threadID dimensions. This reordering is valid, as a statement must have a variance vector which is a superset of the variance vectors of the statements on which it depends. Thus statements with only one dimension in their variance vector cannot depend on any statement with a different dimension or more than one dimension in their variance vector.

In step 320 thread-local memory references in the optimized code are promoted to array references as needed, to ensure that each instance of an object has a unique location in which to store a value. In particular, data that is carried from one partition to another needs to be duplicated so that it is available in each partition. A variable that meets one of the following conditions is promoted to an array reference: local variable that has a cross partition dependency (assigned in one partition and referenced in another partition).

In step 320 translator 220 promotes thread-local memory references to array references. The program shown in TABLE 1 includes a synchronization barrier primitive and divergent references.

TABLE 1

```
__global__ void function( ){
  int leftIndex, rightIndex;
  SharedMem[threadIdX.x] = ...; // store value into shared memory
  leftIndex = ...threadId.x...;
  rightIndex = ...threadId.x;
  __synchthreads( );
  = ...(SharedMem[leftIndex] + SharedMem[rightIndex])/2.0;
}
```

The program shown in TABLE 1 is partitioned into a first partition before the synchthreads primitive and a second partition after the synchthreads primitive. The second partition includes references (leftIndex and rightIndex) that are computed in the first partition and depend from a CTA dimension.

If the divergent references are not promoted, the second partition will incorrectly use the values computed by the last iteration of the first partition. The second partition should use the value computed for each corresponding iteration of threadId.x of the first partition. To ensure that the computation is correct, the divergent references are promoted as shown in TABLE 2.

TABLE 2

```
void function( ) {
  ...
  for (int tid_x = 0; tid_x < dimblock.X; tid_x++) {
    SharedMem[tid.x] = ...; // store value into shared memory
    leftIndexArray[tid_x] = ...threadId.x...;
    rightIndexArray[tid_x] = ...threadId.x;
  }
  for (int tid_x = 0; tid_x < dimblock.X; tid_x++) {
    = ...(SharedMem[leftIndexArray[tid_x]] +
           SharedMem[rightIndexArray[tid_x]])/2.0;
  }
}
```

In step 325 the thread loops are generated for those statements which contain threadID dimensions in their variance vectors. Adaptive loop nesting is used to simultaneously evaluate transformations equivalent to loop interchange, loop fission, and loop invariant removal to achieve the best redundancy removal. The nested loops are dynamically generated over values of each dimension of the threadID tuple to best suit the application, rather than assuming a particular loop nesting and evaluating the application based on that nesting. After the statements are ordered in step 315, loops may be generated for threadID dimensions only around those statements which contain that dimension in their variance vector. To remove loop overhead, translator 220 may fuse adjacent statement groups where one has a variance vector that is a subset of the other.

FIG. 3B is a conceptual diagram illustrating input code 330 that is translated into partitioned code 350, according to one embodiment of the present invention. Input code 330 is configured for execution by multithreaded processing subsystem 112 and includes code sequences 331 and 332 that are separated by synchronization barrier instruction 336. All threads in a CTA will complete execution of code sequence 331 before any one of the threads begins execution of code sequence 332. Translator 220 partitions input code 330 to produce partitioned code 350, where partition 351 includes the instructions represented by code sequence 331 and partition 352 includes the instructions represented by code sequence 332. A thread loop 353 is inserted around partition 352 to ensure that the synchronization semantic is maintained when partitioned code 350 is executed by a general purpose processor that does not natively support the synchronization barrier instruction. In this example, code partition 351 includes convergent references and partition 352 may include divergent references. Therefore, thread loop 353 is inserted around partition 352.

In step 325 of FIG. 3A, translator 220 inserts thread loops (such as thread loop 353) into the optimized code in order to produce code 201 that is translated for execution by CPU 202. Each partition may have a thread loop inserted for each CTA dimension. An example of synchronization partitioning and thread loop insertion is shown in TABLES 3 and 4. A program shown in TABLE 3 is translated into the program shown in TABLE 4.

TABLE 3

```
__global__ void function( ){
  SharedMem[threadIDX.x] = ...; // store value into shared memory
  __synchthreads( );
  =...(SharedMem[threadIDX.x] + SharedMem[threadIdX.x-1])/2.0;
}
```

The program in TABLE 3 uses explicit synchronization to ensure correct sharing of memory between various threads in a CTA. Translator 220 partitions the program into two partitions, each of which is dependent on the x CTA dimension. Therefore, a thread loop is inserted around each of the two partitions to ensure that the translated program performs the operations in the correct order.

TABLE 4

```
Void function( ){
  for (int tid_x = 0; tid_x < dimblock.X; tid_x++) {
    SharedMem[tid_x] = ...; //store value into shared memory
  }
  for (int tid_x = 0; tid_x < dimblock.X; tid_x++) {
    = ...(SharedMem[tid_x] + SharedMem[tid_x - 1])/2.0;
  }
```

A simpler technique for translating a program for execution by a general purpose processor inserts explicit thread loops for each CTA dimension, so that it is not necessary to determine the dimension dependency for references within the same partition. For example, the program shown in TABLE 5 is translated into the program shown in TABLE 6. Note that one or more of the thread loops inserted in TABLE 5 may be unnecessary since the program was produced without determining the dimension dependency.

TABLE 5

```
__global__ void function( ){
  Shared1 = ...
  = Shared1
}
```

TABLE 6

```
void function( ){
  for (int tid_x = 0; tid_x < dimblock.X; tid_x++) {
    for (int tid_y = 0; tid_y < dimblock.Y; tid_y++) {
      for (int tid_z = 0; tid_z < dimblock.Z; tid_z++) {
        Shared1 = ...
        = Shared1
      }
    }
  }
```

FIG. 3C is a conceptual diagram illustrating input code 333 that is translated into optimized code 360, according to one embodiment of the present invention. Input code 333 is configured for execution by multithreaded processing subsystem 112 and includes code sequences 334 and 338 that are separated by synchronization barrier instruction 335. All threads in a CTA will complete execution of code sequence 334 before any one of the threads begins execution of code sequence 338. Translator 220 partitions input code 333 to produce partitioned code 360, where partition 361 includes the instructions represented by code sequence 334 and partitions 362, 364, and 365 include the instructions represented by code sequence 338.

Partition 362 includes a first portion of instructions that are divergent in a first CTA dimension. Partition 364 includes a second portion of instructions that are convergent. Partition 365 includes a third portion of instructions that are divergent in a second CTA dimension. A thread loop 363 is inserted around partition 362 to ensure that the synchronization semantic is maintained when partitioned code 360 is executed by a general purpose processor that does not natively support the synchronization barrier instruction. Thread loop 363 iterates over the first CTA dimension. A thread loop 366 is inserted around partition 365 to iterate over the second CTA dimension.

Figure 4:
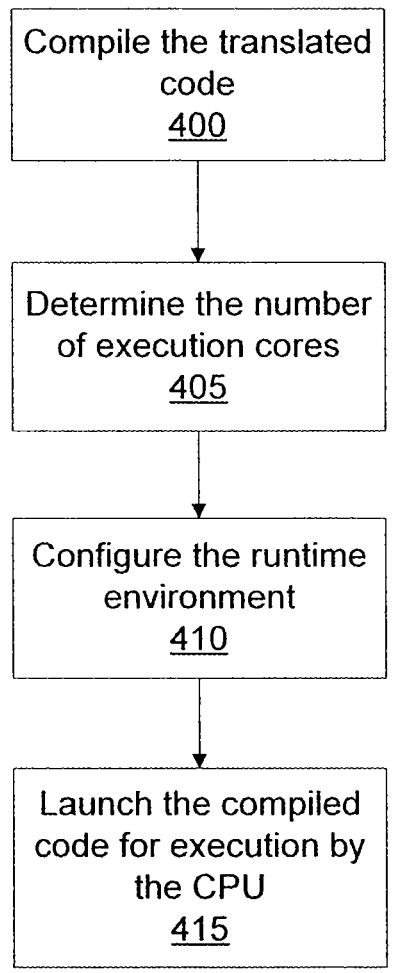
FIG. 4 is a flow diagram of method steps for execution of the translated code by a general purpose processor, according to one embodiment of the present invention.

FIG. 4 is a flow diagram of method steps for execution of the translated code 201 by a general purpose processor, such as CPU 202, according to one embodiment of the present invention. In step 400 compiler 225 compiles translated code 201, optionally performing CPU specific optimizations, to produce compiled code. In step 405 the number of execution cores that are available in CPU 202 is determined by device driver 203. Translated code 201 may be automatically scaled for execution on the available execution cores for improved performance. In step 410 runtime environment 227 or device driver 203 configures CPU 202 to enable the number of execution cores that will execute translated code 201.

Runtime environment 227 may create a number of operating system (OS) runtime threads, which can be controlled by an environment variable. Be default, the number of cores in the system may be used as the number of OS runtime threads. In step 410, the number of CUDA threads to be launched may be evaluated and statistically partitioned to the number of runtime threads. Each runtime thread executes a portion of the compiled code sequentially and waits on a barrier. When all runtime threads reach the barrier, the CTA has completed. In step 415 runtime environment 227 or device driver 203 launches the compiled code for execution by CPU 202.

Variance Analysis

In order to compile a CUDA program for execution on a processor that does not support direct parallel execution of threads in a CTA, a thread (or vector) loop is generated around program statements that depend on one or more threadIDs, thread dimensions x, y, and z. Variance analysis determines the minimal set of statements that must be considered for thread loop execution. The result of the variance analysis is used to promote thread local memory references to array references in step 320 of FIG. 3A and to insert thread loops in step 325 of FIG. 3A. Each statement of the CUDA program is annotated for each threadID dimension, e.g., x, y, and z. The annotations are referred to as variance vectors. Implicitly, atomic intrinsics are considered as a "use" of each dimension of the thread index, as their return value could vary for each CUDA thread.

Figure 5A:
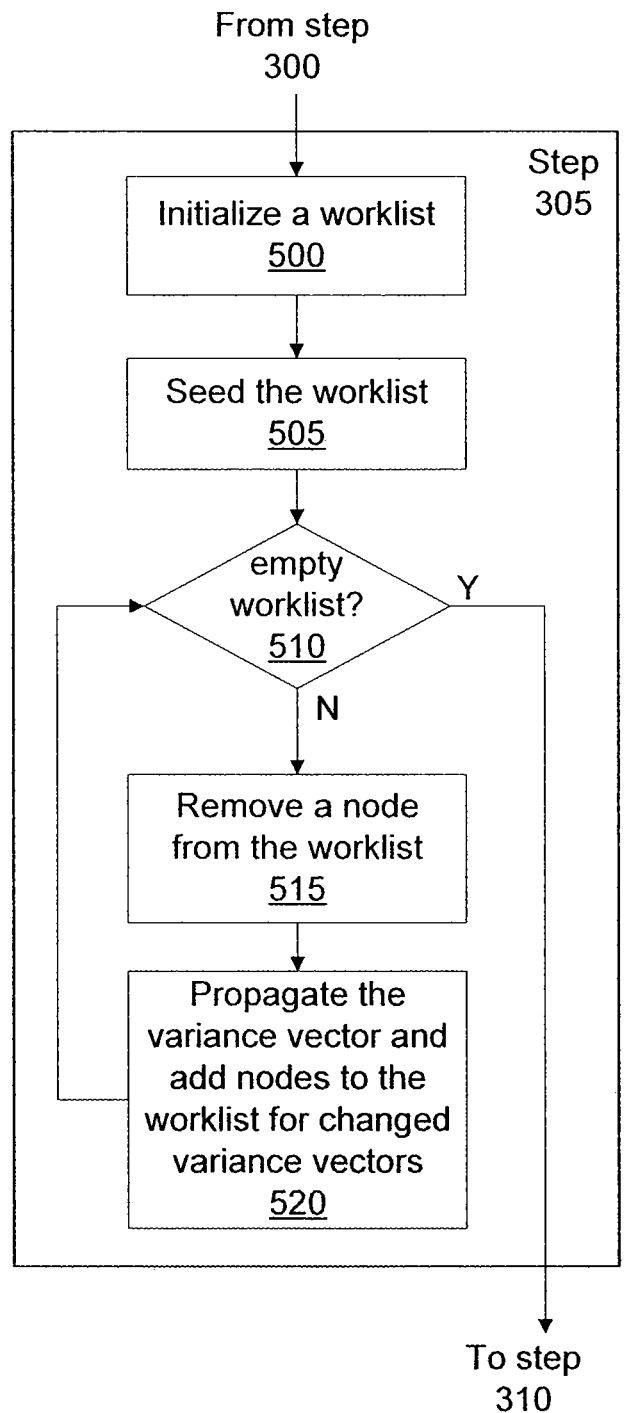
FIG. 5A is a flow diagram of method steps for performing a step shown in FIG. 3A, according to one embodiment of the present invention.

FIG. 5A is a flow diagram of method steps for performing step 305 shown in FIG. 3A, according to one embodiment of the present invention. In step 500 a worklist is initialized as an empty list. In step 505 the worklist is seeded to populate the worklist with each node and the set of threadIDs that the node depends on. For example, the pseudocode shown in TABLE 7 may be used to seed the worklist, where i is a threadID dimension, e.g., x, y, and z.

TABLE 7

```
For each statement node do {
    if statement node loads from thread i then
        variance vector(node) += {i};
        worklist += {node};
    else if statement node is an atomic intrinsic then
```

TABLE 7-continued

```
        variance vector(node) += {x, y, z};
        worklist += {node};
    else
        variance vector (node) = { };
    endif
}
```

Each node is annotated with a variance vector which is three bits, one for each of the different threadID dimensions. Each node will be traversed and possibly added to the worklist at most three times, once for each threadID dimension (i).

In step 510 translator 220 determines if the worklist is empty, and, if so, then the translator proceeds to step 310 of FIG. 3A. Otherwise, in step 515 translator 220 removes a node from the worklist. In step 520 translator 220 propagates the threadID dimensions as a variance vector through the program. When the variance vector propagation is complete, translator 220 returns to step 510 to determine if the variance analysis is complete. The variance analysis is complete when, in step 510, the worklist is empty. Translator 220 iterates through every element of the worklist, traversing the data flow and control dependence successors, while updating the variance vectors of each traversed node. When the variance vector of a traversed node changes in step 520, the node is added to the worklist. The pseudocode shown in TABLE 8 may be used to perform steps 510, 515, and 520, where vvector(n) is the variance vector of node n and the dataflow analysis may be represented by definition-use (def-use) chains. A def-use chain represents a variable and all the uses of that variable that are reachable from the definition, without any other intervening definitions.

TABLE 8

```
while (worklist is not empty) do {
    pick a node n from the worklist;
    worklist -= {n};
    if n is an expression in a statement s then
        if merge(vvector(n), vvector(s)) != vvector(s) then
            vvector(s) = merge(vvector(n), vvector(s));
            worklist += {s};
        endif
    endif
    if n is statement then
        for each s reached by n in the def-use chains do
            if merge(vvecto(n), vvector(s)) != vvector(s) then
                vvector(s) = merge(vvector(n), vvector(s));
                worklist += {s};
            endif
        endfor
    endif
    if n is an expression in the condition of an if statement then
        for each s in the then and the else part of the if statement do
            if merge(vvector(n), vvector(s)) != vvector(s) then
                vvector(s) = merge(vvector(n), vvector(s));
                worklist += {s};
            endif
        endfor
    endif
    if n is an expression in the condition of a while loop then
        for each s in the body of the while loop do
            if merge(vvector(n), vvector(s)) != vvector(s) then
                vvector(s) = merge(vvector(n), vvector(s));
                worklist += {s};
            endif
        endfor
    endif
    if n is an expression in the condition of a do loop then
        for each s in the increment and the body of the do loop do
            if merge(vvector(n), vvector(s)) != vvector(s) then
                vvector(s) = merge(vvector(n), vvector(s));
                worklist += {s};
```

TABLE 8-continued

```
        endif
      endfor
    endif
  endwhile
```

Control dependence is used to propagate the threadID dimension dependencies. In the program shown in TABLE 9 the variable i is a function of threadID, after the loop terminates. Since j is always 1 more than i, j also depends on the threadId. The dependence of j on threadID dimension x is accomplished by marking every statement in the body of the loop as dependent on threadID.

TABLE 9

```
k = threadId.x −1;
i = 0
j = 1;
while (i < threadID.x) {
  j = j+1;
  S;
  i = i+1;
}
```

Generating code for partitions after variance analysis can remove some redundant computation, analogous to loop invariant removal. Each node is identified as dependent on specific dimensions of the threadID value. Therefore, a node without a particular dimension in its variance vector does not need to be contained within a loop iterating through the range of values of the threadID dimension.

In the simplest case, and perhaps the most common, a programmer may intend to only use a subset of the dimensions of the threadID tuple to distinguish threads from each other, implicitly assuming that all of the other dimensions will have a constant value of 1 for all CUDA threads. In this case, the programmer writes a kernel never using one or more dimensions of the threadID except to distinguish the threads from each other. In this case, the variance analysis will discover that the implicitly constant value is never used, and will not have to generate a loop for that dimension of the threadID for any partition.

Barrier Synchronization Partitioning

In order to execute all CUDA threads within a thread group using a single CPU thread, ordering of the computation of the CUDA threads is serialized and scheduled to maintain the semantics of barrier synchronization. A single program multiple data (SPMD) parallelism program that includes synchronization barriers and regular control flow is divided into partitions that include groups of one or more statements without barrier synchronization. Each statement is examined in sequence to determine whether or not it includes a barrier statement. If not, it is included in the current partition. Otherwise, the statement is a barrier statement and therefore defines a partition boundary between the current partition and a new partition. When the statement is a control-flow construct that contains a barrier, then the beginning of the construct is a partition boundary. The internal structure of the control-flow construct is then recursively analyzed to partition the statements within the control-flow construct. Another condition that creates a new partition is the reconvergence point (immediate post-dominator) of a branch where at least two paths of control flow meet, each of which originated from a separate partition. The code beginning with the point of reconvergence is either replicated and appended to each potentially preceding partition or a partition boundary is created to form a new partition.

Figure 5B:
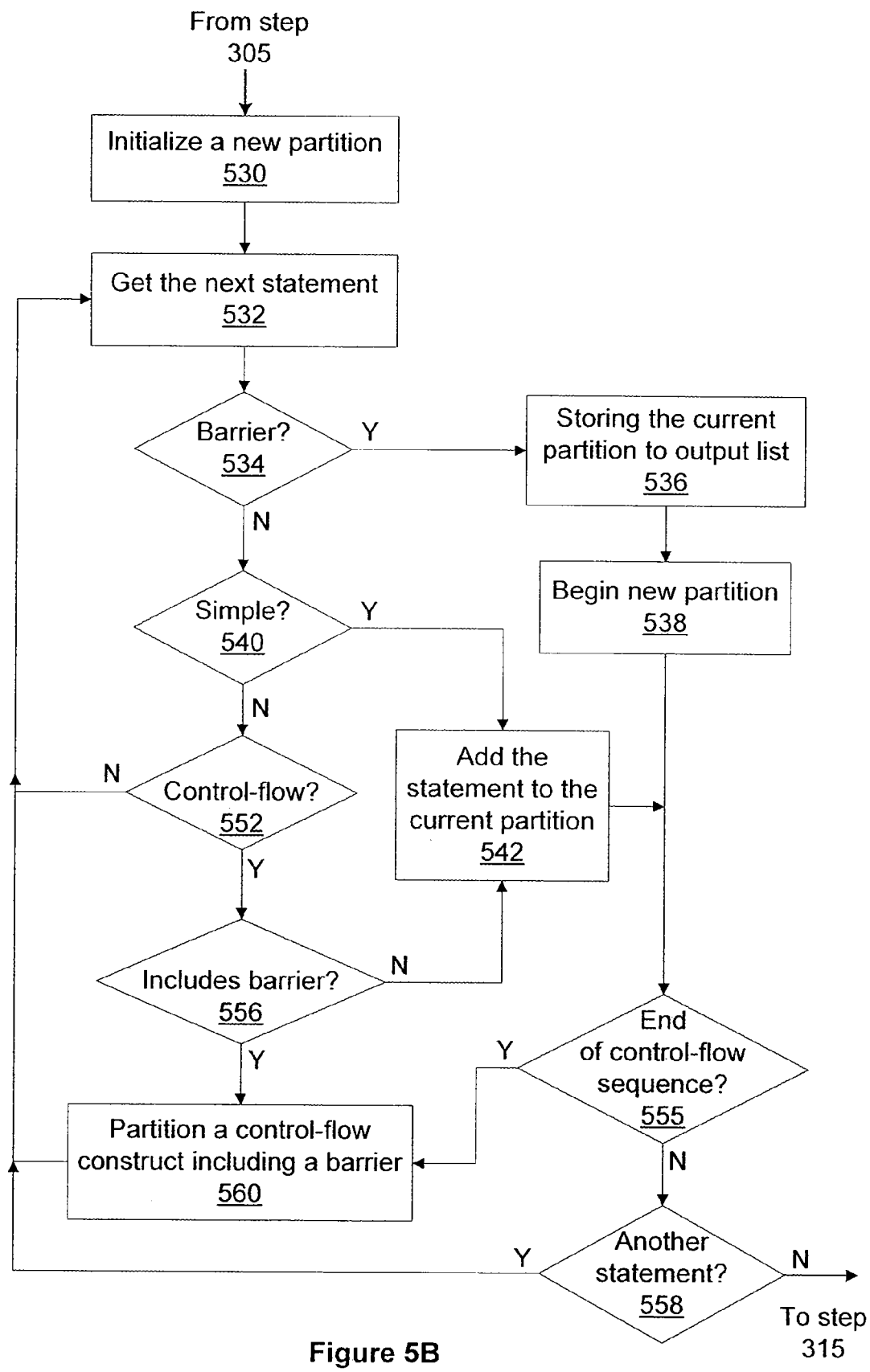
FIG. 5B is a flow diagram of method steps for performing another step shown in FIG. 3A, according to one embodiment of the present invention.

FIG. 5B is a flow diagram of method steps for performing step 310 shown in FIG. 3A, according to one embodiment of the present invention. In step 530 translator 220 starts a new partition and sets the output list to the output list of partitions. When a new partition is generated, the current partition is added to the output list. When the partitioning is complete, the output list of partitions includes the final list of partitions for all of the statements in the code. In step 532 translator 220 obtains the next statement to be translated. The partition created in step 532 is the current partition and the next statement may be the next statement in the code or the next statement in a control-flow sequence. As previously explained, control-flow constructs are recursively partitioned when they include a barrier primitive.

In step 534 translator 220 determines if the statement is a barrier synchronization primitive, and, if not, translator proceeds to step 540. Otherwise, in step 536 translator 220 adds the current partition to the output list. In step 538 translator 220 begins a new partition since the barrier synchronization primitive defines a partition boundary. In step 555 translator 220 determines if the end of a control-flow sequence is reached. If the end of a control-flow sequence is reached, then translator proceeds to step 558 and determines if another statement exists in the code, and, if not, translator 220 proceeds to step 315 and the partitioning process is complete. If, in step 558 translator 220 determines that another statement does exist in the code, then translator 220 returns to step 532 to continue partitioning with the next statement in the code or control-flow sequence.

If, in step 555 translator 220 determines that the end of a control-flow sequence is reached, then translator 220 proceeds to step 560 to partition the control-flow construct that includes a barrier. After step 560 is completed, translator 220 returns to step 532 to continue processing the code following the control-flow sequence. The details of step 560 are described in conjunction with FIG. 5C.

If in step 534 the statement is not a barrier synchronization primitive, then in step 540 translator 220 determines if the statement is a simple statement, i.e, not a control-flow construct. If the statement is a simple statement, then in step 542 translator 220 adds the statement to the current partition and proceeds to step 555. Otherwise, in step 552 translator 220 determines if the statement is the start of a control-flow construct, and, if not, the statement indicates the start of a sequential block of statements and translator 220 returns to step 532 to recursively partition the sequential block of statements. If, in step 552 translator 220 determines that the statement represents the start of a control-flow construct, then in step 556 translator 220 determines if the control-flow construct, includes a barrier primitive. If the control-flow construct does not include a barrier primitive, then translator proceeds to step 542 to add the control flow construct to the current partition. Otherwise, translator 220 proceeds to step 560 to complete partitioning of the control-flow construct.

Figure 5C:
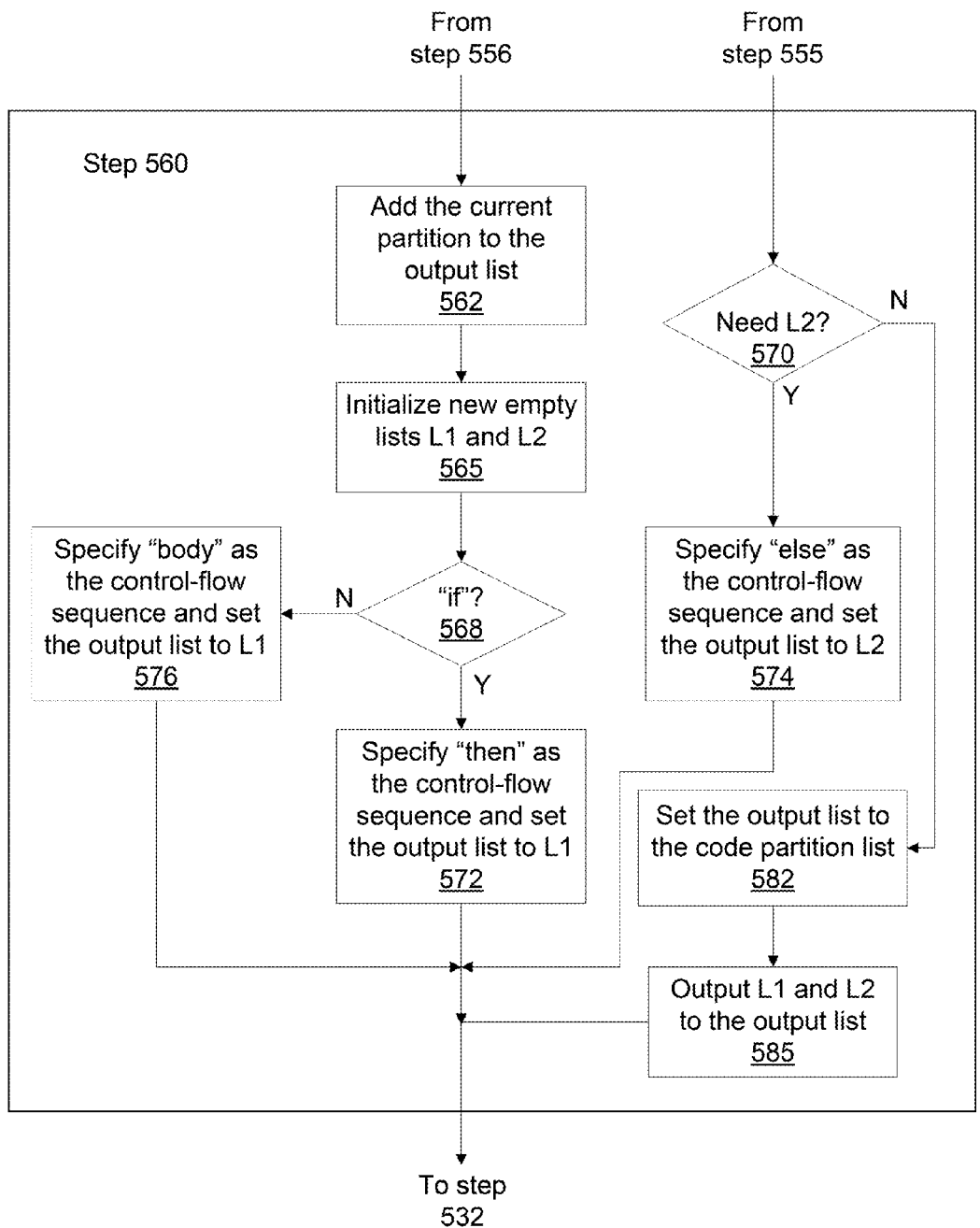
FIG. 5C is a flow diagram of method steps for performing a step shown in FIG. 5B, according to one embodiment of the present invention.

FIG. 5C is a flow diagram of method steps for performing step 560 shown in FIG. 5B, according to one embodiment of the present invention. In step 562 translator 220 adds the current partition to the output list of partitions. In step 565 translator 220 initializes empty lists of partitions L1 and L2 to use during the partitioning of the control-flow construct. Note that L1 and L2 may already exist if a control-flow construct is nested within another control-flow construct, in which case new L1 and L2 lists are created. In step 568 translator 220 determines if the statement is an "if" statement, and, if not, then in step 576 translator 220 sets the output list to L1 and specifies the body of the control-flow construct as the control flow sequence. Translator 220 then proceeds to step 532 to partition the body of the control-flow construct, e.g., while loop, to produce the output list L1. Note that the control-flow construct is recursively partitioned, so steps 532 through 560 are repeated until the entire control-flow construct is partitioned.

If, in step 568 translator 220 determines that the statement is an "if" statement, then in step 572 translator 220 temporarily defines L1 as the output list so that the statements in the current partition are collected in L1 and specifies the "then" portion of the control-flow construct as the control-flow sequence before proceeding to step 532 to partition the "then" portion of the control-flow construct and produce the output list L1.

When step 555 is reached, the then portion of the control-flow construct is complete, and in step 570 translator 220 determines if an output list L2 should be produced. L2 is produced by partitioning the "else" portion of a control-flow sequence. When translator 220 determines that the output list L2 should be produced, in step 574 translator 220 sets the output list to L2 and specifies the "else" portion of the control-flow construct as the control-flow sequence. Translator then proceeds to step 532 to produce the output list L2. If, in step 570 translator 220 determines that the output list L2 has been produced or that L2 is not needed, then partitioning of the control-flow construct is complete, and in step 582 translator 220 sets the output list to the output list of partitions. In step 585 translator 220 appends L1 and L2 to the output list (output list of partitions) and then returns to step 532 to start a new partition.

The result of the partitioning process is the output list of partitions that is a list of code partitions that are free of barriers. The partitioning technique shown in FIGS. 5B and 5C is optimal in that, for structured code, the partitioning technique produces the smallest number of distinct partitions possible, allowing translator 220 to produce translated code while minimizing replication of regions of code. Translator 220 may then completely serialize the statements executed by each CUDA thread in the partition, or choose any other interleaving desirable to remove redundancy or for any other beneficial reason.

Performance Optimization

When translating CUDA programs to run on general purpose processors, such as CPU 202, the code is transformed so that the local program state that crosses synchronization barriers is scalar expanded (or vectorized). A naïve method would scalar expand every local datum and transform every reference to use the vector reference. Instead, it is possible to optimize the program to use vector form where essential and use scalar form where appropriate while respecting the original CUDA program semantics. This approach yields translated code that executes more efficiently on a general purpose processor.

In order to optimize the performance of the CUDA program, the CUDA program should be partitioned, the variance analysis should completed to classify each program statement as a vector or scalar statement, and data flow information describing dependency information between program statements should be available. The data flow information may be represented in static single assignment (SSA) form, def-use chains, or the like.

When a CUDA program is serialized, the data that is conceptually private to each thread does not necessarily need to be stored in separate memory locations. In particular, values which have a live range completely contained within a partition can potentially avoid replication. Replication is performed by promoting a variable from a scalar variable to a vector variable. Two cases arise in which variable replication should be applied to the output value of an assignment with a non-empty variance vector. The first case is when a variable is used in another partition. The second case is when a variable is used in a different way when a loop over thread indexes is placed around the partition. Thread-local memory assignments which have an empty variance vector, technically never need to write to a replicated location. However, a use with some unreplicated and some replicated definitions reaching it would require a runtime test to determine whether to read the replicated or unreplicated value, depending on the path taken to reach that use. Alternatively, having all definitions reaching a vector variable, write to the vector variable eliminates the need for this additional complexity of a runtime test. Therefore, for any use that is reachable by at least one replicated definition, all its potential definitions must write to the replicated location.

Figure 6:
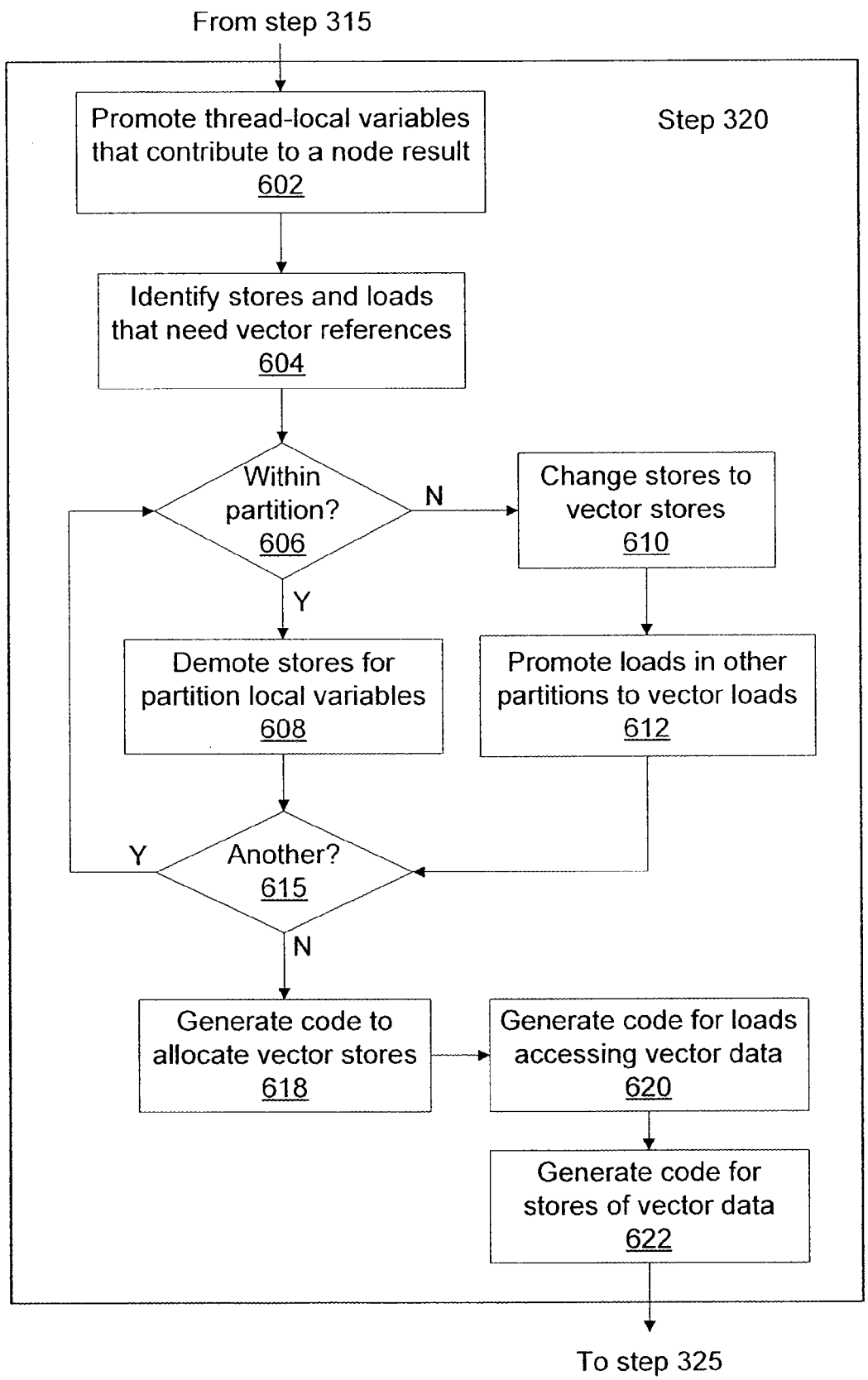
FIG. 6 is a flow diagram of method steps for performing another step shown in FIG. 3A, according to one embodiment of the present invention.

FIG. 6 is a flow diagram of method steps for performing step 320 shown in FIG. 3A, according to one embodiment of the present invention. In step 602 translator 220 identifies any thread-local memory variables that contributes to the result of a vector statement and promotes the identified thread-local memory variables to vector form. A vector statement depends on at least one other vector statement. However, there may be a scalar statement (a statement that does not require vector execution) that may affect the result of a vector statement. Each vector statement in a partition is traversed based on the data flow to identify any scalar memory statements that the vector statement depends on. The identified scalar statements are promoted to vector form. The identification process is performed for each partition.

In step 604 translator 220 identifies store and load operations that need vector references. Vector statements that update local variables are traversed. Uses of the local variable are analyzed to determine which partition(s) those uses reside in. Candidate vector statements (statements that modify local state) are traversed in each partition and the load and store operations of the target local variables are classified based on whether or not all uses of the target variable are within a single partition. In step 606 translator 220 determines if all uses of a target local variable are within the single partition, and, if so, in step 608 the store of the target local variable is demoted to a scalar store and all loads or uses of the target local variable remain as scalar loads.

If, in step 606 translator 220 determines that all uses of a target local variable are not within the single partition, then in step 610 the store is changed to write to a vector store. In step 612 any loads that are in a different partition are promoted to vector loads. Loads that are in the partition remain as scalar loads. This ensures that scalar loads in the same partition read from the original location, while vector loads read from a vector location.

In step 615 translator 220 determines if another load or store was identified in step 604, and, if not, the local variable traversal for vector promotion is complete and translator 220 proceeds to step 618. Otherwise, translator 220 returns to step 606 to traverse another local variable. In step 618 code is generated to allocate appropriately dimensioned vectors for the vector stores at the beginning of the translated program. In step 620 code is generated for all loads requiring access to the vector data. The following code sequence is inserted before the vector load, where X is the local variable.

X=LOAD Vector(X)[threadID]
Load X

In step 622 code is generated for stores of vector data. The following code sequence is used to store the data in a vector form.
STORE X, VALUE
STORE Vector(X)[threadID], X Loop Insertion Finally, in step 325 of FIG. 3A, the thread loops are inserted into the code 101 by translator 220 to complete the translation of CUDA code, producing code 201 for execution by a general purpose processor. Translator 220 generates loops over thread index dimensions only around those statements which contain that dimension in their variance vector. To remove loop overhead, translator 220 may fuse adjacent statement groups where one has a variance vector that is a subset of the other. Translator 220 may use cost analysis techniques to evaluate and perform loop fusion operations. Minimal variable replication and adaptive loop nesting share an interesting interplay in that the maximal fusing of loops can introduce additional cases requiring replication.

TABLE 10 shows an example CUDA kernel and TABLE 11 shows the translation of the CUDA kernel for execution by a general purpose processor. The example kernel multiplies a list of small matrices. Each thread block computes one small matrix multiplication out of the list, while each thread computes one element of the result matrix for its block.

TABLE 10

Example CUDA kernel

```
(1)   __global__ small_mm_list(float* A_list, float* B_list, , const int size)
{
(2)     float sum;
(3)     int matrix_start, col, row, out_index, i;
(4)     martrix_start = blockIdx.x*size*size;
(5)     col = matrix_start + threadIdx.x;
(6)     row = matrix_start + threadIdx.y * size);
(7)     sum = 0.0;
(8)     for (i = 0; i < size; i++)
(9)       sum += A_list[row + i] * B_list[col + (i*size)];
        // Synchronize before overwriting input data
(10)    _syncthread( );
(11)    out_index = matrix_start + (threadIdx.y * size) + threadIdx.x;
(12)    A_list[out_index] = sum;
}
```

Note that the statement at line (9) of TABLE 10 has a variance vector of (x,y) since col is dependent on the x dimension and row is dependent on the y dimension. The z dimension is never used, so no loop is inserted that iterates over z. Typical cost analysis techniques may be used to determine cases such as statements 5 and 6 in the example kernel shown in TABLE 10. As each is only dependent on one threadID dimension, choosing either nesting order of the x and y index loops will force either redundant execution of a statement, or a redundant loop outside the main loop nest of the partition.

TABLE 11

Translated CUDA kernel

```
(1)   __global__ small_mm_list(float* A_list, float* B_list, , const int size)
{
(2)     float sum[ ];
(3)     int matrix_start[ ], col[ ], row[ ], out_index, i;
(4)     matrix_start[threadID] = blockIdx.x*size*size;
```

TABLE 11-continued

Translated CUDA kernel

```
      for(threadID.x = 0; threadID.x < blockDim.x; threadID.x++) {
(5)     col[threadID] = matrix_start + threadIDx.x;
        for(threadID.y = 0; threadID.y < blockDim.y; threadID.y++) {
(6)       row[threadID] = matrix_start[threadID] + (threadIDx.y * size);
(7)       sum[threadID] = 0.0;
(8)       for (i[threadID] = 0; i < size; i++)
(9)         sum[threadID] += A_list[row[threadID] + i] *
                B_list[col[threadID] + (i*size)];
        }
      }
(10)
      for (threadID.x = 0; threadID.x < blockDim.x; threadID.x++) {
        for (threadID.y = 0; threadID.y < blockDim.y; threadID.y++) {
(11)      out_index = matrix_start[threadID] +
              (threadID.y * size) + threadID.x;
(12)      A_list[out_index] = sum[threadID];
        }
      }
}
```

Translator 220, compiler 225, and runtime environment 227 are used to convert CUDA application programs into code for execution by a generator purpose CPU. The CUDA programming model supports bulk synchronous task parallelism, where each task is composed of fine-grained SPMD threads. Use of the CUDA programming model has been limited to programmers willing to write specialized code for execution by GPUs. This specialized code may be converted for execution by a general purpose CPU without requiring the programmer to rewrite the CUDA application program. The three key abstractions supported by CUDA are SPMD thread blocks, barrier synchronization, and shared memory. Translator 220 serializes operations across the fine-grained threads of a CUDA thread block into a single CPU thread and performs optimizing transformations to convert a CUDA application program.

While the foregoing is directed to embodiments of the present invention, other and further embodiments of the invention may be devised without departing from the basic scope thereof. For example, aspects of the present invention may be implemented in hardware or software or in a combination of hardware and software. One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored. Such computer-readable storage media, when carrying computer-readable instructions that direct the functions of the present invention, are embodiments of the present invention. Therefore, the scope of the present invention is determined by the claims that follow.

The invention claimed is:

1. A computer-implemented method for promoting thread-local memory references of application program as part of translating the application program for execution by a general purpose processor, the method comprising:

receiving the application program written using a parallel programming model for execution on a multi-core graphics processing unit;

partitioning the application program into regions of synchronization independent instructions to produce a partitioned application program;

identifying a thread-local memory reference of the partitioned application program that contributes to a result of a first vector statement in the partitioned application program; and promoting the thread-local memory reference to a vector reference to produce a translated application program.

2. The method of claim 1, further comprising the step of identifying load operations and store operations in the partitioned application program that need vector references.

3. The method of claim 2, further comprising the step of demoting a target variable specified by a store operation to a scalar variable when the target variable is used only within a single partition of the partitioned application program.

4. The method of claim 2, further comprising the step of promoting a target variable specified by a store operation to a vector variable when the target variable is used in at least two partitions of the partitioned application program.

5. The method of claim 4, further comprising the step promoting a load operation that specifies the vector variable to a vector load operation when the load operation is in a different partition of the partitioned application program than the store operation.

6. The method of claim 1, further comprising the step of executing the translated application program using the general purpose processor.

7. The method of claim 1, further comprising the step of inserting a loop nest around at least one region of the partitioned application program, wherein the loop nest iterates over a cooperative thread array dimension that corresponds to the number of threads that are concurrently executed by the parallel processor within the multi-core graphics processing unit.

8. A non-transitory computer-readable medium that includes instructions that, when executed by a general purpose processor, configure the general purpose processor to promote thread-local memory references of application program as part of translating the application program for execution by a general purpose processor, by performing the steps of:

receiving the application program written using a parallel programming model for execution on a multi-core graphics processing unit;

partitioning the application program into regions of synchronization independent instructions to produce a partitioned application program;

identifying a thread-local memory reference of the partitioned application program that contributes to a result of a first vector statement in the partitioned application program;

and promoting the thread-local memory reference to a vector reference to produce a translated application program.

9. The non-transitory computer-readable medium of claim 8, further comprising the step of identifying load operations and store operations in the partitioned application program that need vector references.

10. The non-transitory computer-readable medium of claim 9, further comprising the step of demoting a target variable specified by a store operation to a scalar variable when the target variable is used only within a single partition of the partitioned application program.

11. The non-transitory computer-readable medium of claim 9, further comprising the step of promoting a target variable specified by a store operation to a vector variable when the target variable is used in at least two partitions of the partitioned application program.

12. The non-transitory computer-readable medium of claim 11, further comprising the step promoting a load operation that specifies the vector variable to a vector load operation when the load operation is in a different partition of the partitioned application program than the store operation.

13. The non-transitory computer-readable medium of claim 8, further comprising the step of executing the translated application program using the general purpose processor.

14. The non-transitory computer-readable medium of claim 8, further comprising the step of inserting a loop nest around at least one region of the partitioned application program, wherein the loop nest iterates over a cooperative thread array dimension that corresponds to the number of threads that are concurrently executed by the parallel processor within the multi-core graphics processing unit.

15. A computing system configured to promote thread-local memory references of application program as part of translating the application program for execution by a general purpose processor, comprising:

a processor configured to execute a translator; and a system memory coupled to the processor and configured to store the translator, a first application program, and a second application program, the first application program written using a parallel programming model for execution on a multi-core graphics processing unit, the second application program configured for execution by the general purpose processor, and the translator configured to:

receive the first application program;

partition the first application program into regions of synchronization independent instructions to produce a partitioned application program;

identify thread-local memory references of the partitioned application program that contribute to results of vector statements in the partitioned application program; and promote the thread-local memory references to vector references to produce a translated application program as the second application program.

16. The computing system of claim 15, wherein the translator is further configured to identify load operations and store operations in the partitioned application program that need vector references.

17. The computing system of claim 16, wherein the translator is further configured to demote a target variable specified by a store operation to a scalar variable when the target variable is used only within a single partition of the partitioned application program.

18. The computing system of claim 16, wherein the translator is further configured to promote a target variable specified by a store operation to a vector variable when the target variable is used in at least two partitions of the partitioned application program.

19. The computing system of claim 18, wherein the translator is further configured to promote a load operation that specifies the vector variable to a vector load operation when the load operation is in a different partition of the partitioned application program than the store operation.

20. The computing system of claim 15, wherein the translator is further configured to insert a loop nest around at least one region of the partitioned application program, wherein the loop nest iterates over a cooperative thread array dimension that corresponds to the number of threads that are concurrently executed by the parallel processor within the multi-core graphics processing unit.

* * * * *